United States Patent [19]
Houk

[11] 4,036,066
[45] July 19, 1977

[54] TRANSMISSION MODULATOR VALVE CONTROL

[75] Inventor: Richard D. Houk, Stow, Ohio

[73] Assignee: Samuel Moore and Company, Aurora, Ohio

[21] Appl. No.: 678,726

[22] Filed: Apr. 21, 1976

[51] Int. Cl.² .............................................. F16H 25/08
[52] U.S. Cl. .......................................... 74/55; 74/513
[58] Field of Search ............................ 74/55, 57, 513

[56] References Cited

U.S. PATENT DOCUMENTS

| 2,993,488 | 7/1961 | Stec | 74/55 UX |
| 3,424,016 | 1/1969 | McMillen | 74/57 |

*Primary Examiner*—Edgar W. Geoghegam

*Attorney, Agent, or Firm*—Hamilton, Renner & Kenner

[57] ABSTRACT

An actuator for an automatic transmission modulator valve which automatically changes shift speeds proportional to demand on the engine from idle to full throttle. The actuator is preferably controlled by a push-pull cable operatively connected to the throttle or accelerator, and exerts pressure on the push pin of the modulator valve in direct proportion to the travel of the throttle. The actuator utilizes balls between inclined surfaces on interfacing rotary and stationary cam plates and the cable applies rotating force through a moment arm to the rotary plate to obtain a substantial mechanical advantage in the amount of pressure applied to the push pin.

17 Claims, 10 Drawing Figures

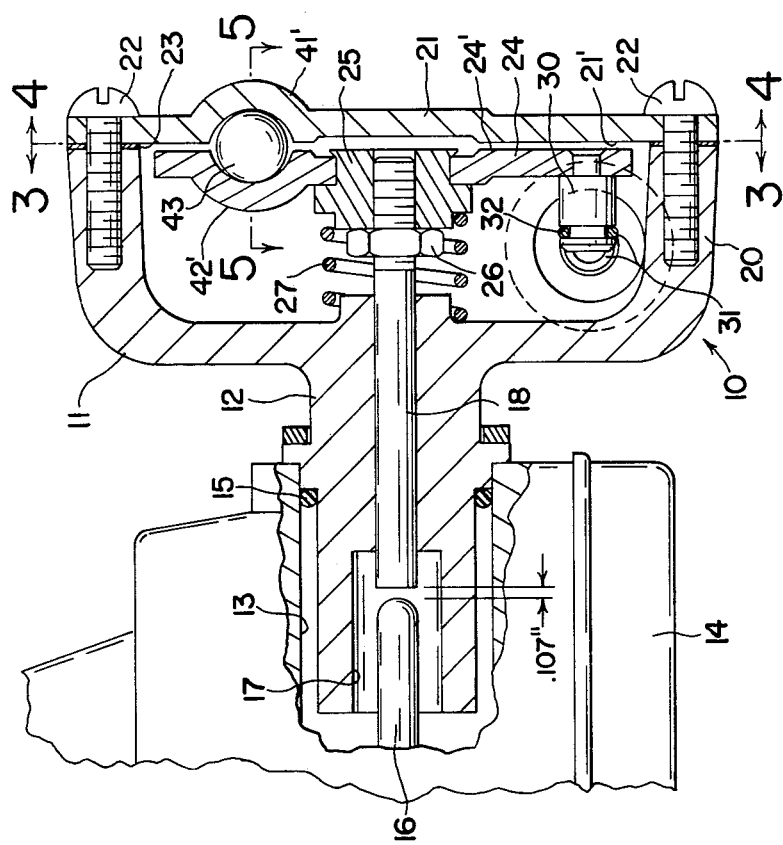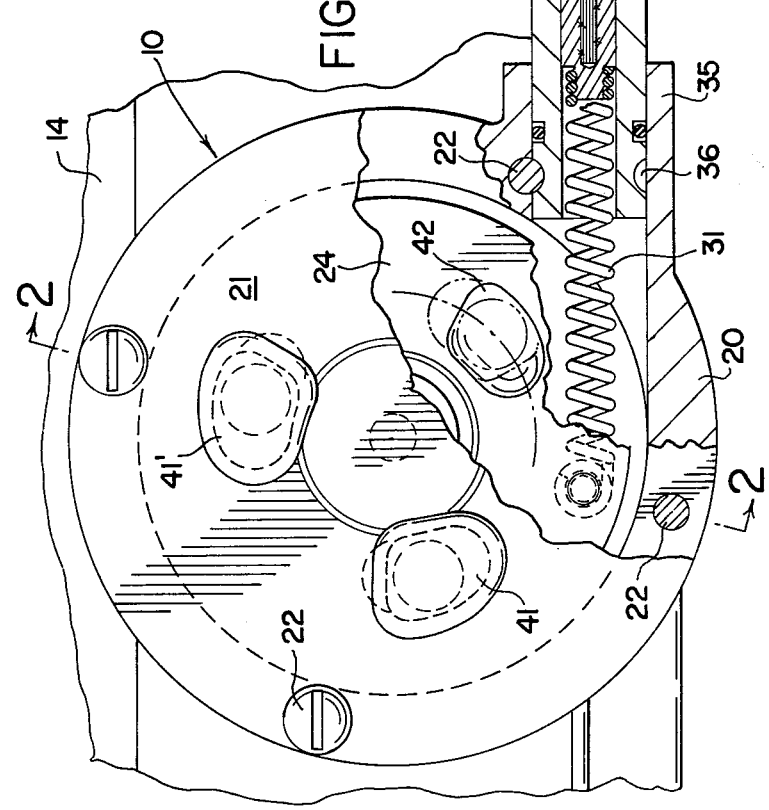

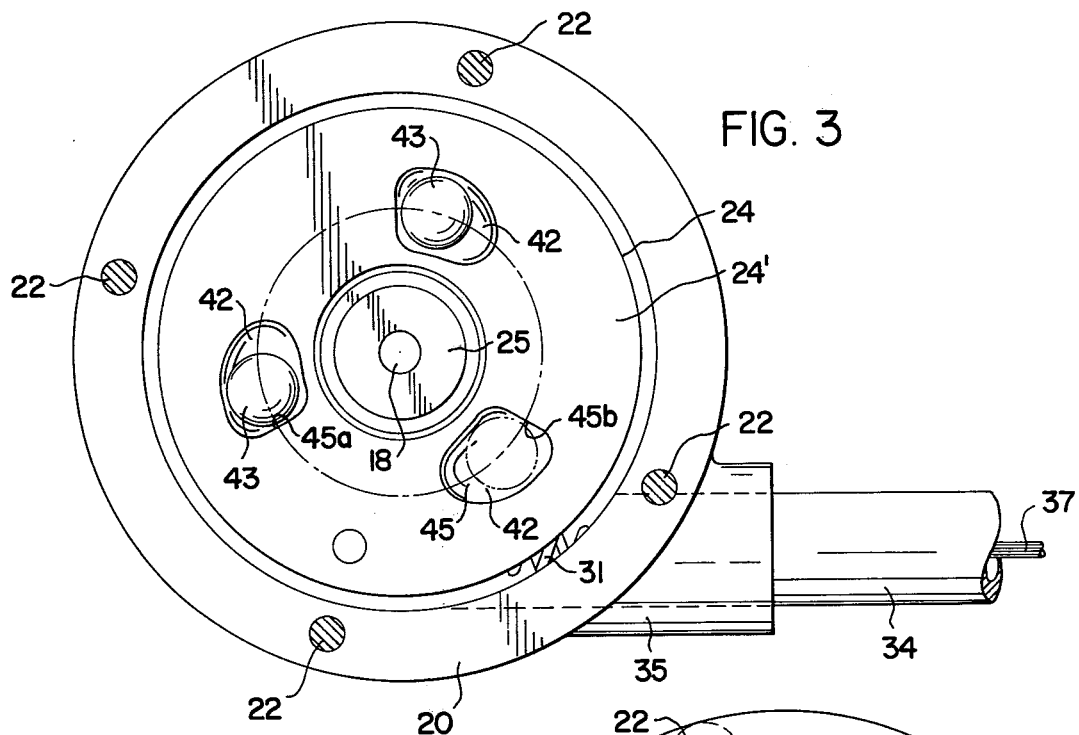
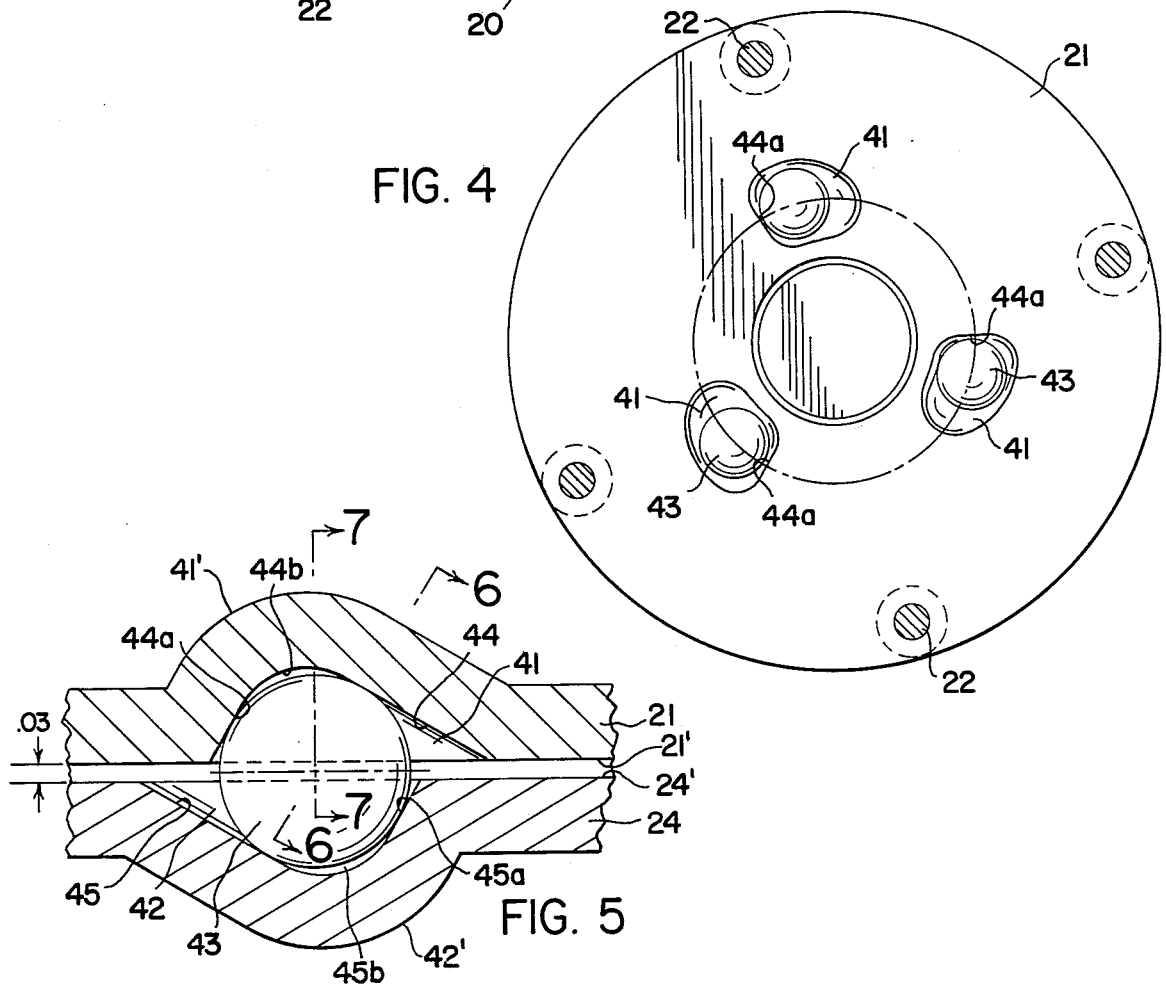

TRANSMISSION MODULATOR VALVE CONTROL

BACKGROUND OF THE INVENTION

A modulator valve for an automatic transmission is controlled by pressure applied linearly by a push pin, and zero force is required to be applied to the push pin at idle throttle position and up to 15.5 pounds force at full throttle positions.

Due to manufacturing tolerances the relative position of the end of the push pin within each transmission varies and certain prior actuators for applying force to the push pin have not compensated for these variations and accordingly have failed to apply force to the push pin in direct proportion to the travel to the throttle. Further, such prior actuators have been so inefficient as to require application of force to the throttle at least equal to and sometimes in excess of the force applied to the push pin, thus increasing the required operating force.

SUMMARY OF THE INVENTION

A push-pull cable is connected at one end to the throttle or accelerator and the other end is connected by a tension spring tangentially to a rotary cam plate in the actuator, said plate having an axial rod for transmitting linear force against the end of the push pin. A stationary cam plate faces the rotary cam plate and the two plates are separated by circumferentially spaced ball confined between circumferentially inclined complementary surfaces on the two plates whereby the force applied by the cable is transmitted linearly to the push pin in direct proportion to the throttle travel and at a substantially increased value.

It is an object of the present invention to provide an improved actuator for the modulator valve of a transmission which will apply force to the valve push pin in direct proportion to the throttle travel.

Another object is to provide an improved actuator which will transmit a substantially increased force to the valve push pin over the force transmitted from the throttle, thereby reducing the required operating force.

A further object is to provide an improved actuator which is of minimal size, is completely sealed and is easily installed on conventional automatic transmissions.

A still further object is to provide an improved actuator which compensates for variations in the linear position of the push pin relative to the transmission housing.

BRIEF DESCRIPTION OF THE DRAWINGS

FIG. 1 is a plan elevational view of the improved actuator applied to a transmission housing, the actuator being partly broken away and in section to show connection with the throttle cable.

FIG. 2 is a sectional view on line 2—2 of FIG. 1, showing the adjacent portion of the transmission housing in elevation, and showing the allowable variation in the push pin location.

FIG. 3 is a sectional view on line 3—3 of FIG. 2.

FIG. 4 is a sectional view on line 4—4 of FIG. 2.

FIG. 5 is an enlarged partial sectional view on line 5—5 of FIG. 2.

DESCRIPTION OF A PREFERRED EMBODIMENT

Figure 6:
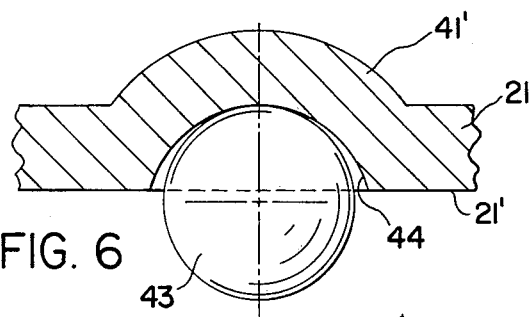
FIG. 6 is a partial sectional view on line 6—6 of FIG. 5.
Figure 7:
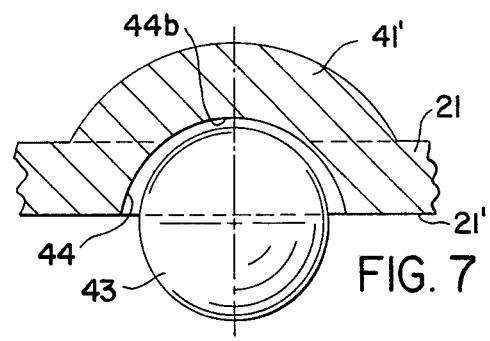
FIG. 7 is a partial sectional view on line 7—7 of FIG. 5.

The variation in the linear location of the push pin in the transmission housing varies from one transmission to another a distance of 0.107 inches due to manufacturing tolerances. The improved actuator comprising the present invention compensates for this variation by taking up this much lost motion during the initial movement of the throttle cable when required. A maximum of 25% initial throttle travel is permitted before applying linear force to the push pin of the modulator valve, and the improved actuator is designed to take up the 0.107 inch lost motion within the initial 25% throttle travel.

Referring to FIG. 2 of the drawings, the improved actuator indicated generally at 10 has a housing 11 provided axially with a neck portion 12 which fits within a tubular recess 13 in the transmission housing 14, and is sealed therein preferably by an O-ring 15. The push pin 16 which controls the modulator valve (not shown) is located in the recess 13. The neck 12 has a recess 17 which receives the pin 16 and an axial push rod 18 extends into the recess 17 in axial alignment with the push pin 16.

As shown in FIG. 2, the end of the push pin 16 is spaced from the end of push rod 18 a distance of 0.107 inches, which is the maximum variation in pin location due to manufacturing tolerances. It will be understood that with other transmissions this distance may vary from 0.107 inches to zero.

The actuator housing 11 has an annular wall 20 and a closure plate 21 is attached to the face of wall 20 by screws 22, there being an annular gasket 23 interposed between the face of wall 20 and plate 21. Within the housing 11 and facing the plate 21 is a rotary plate 24 in parallel spaced relation thereto. The rotary plate 24 has an axial hub 25 secured therein, and the push rod 18 is screwed into the hub 25 with a lock nut 26 threaded on the rod and abutting the hub. The push rod 18 extends slidably through the neck portion 12 of the housing. A compression spring 27 interposed between the hub 25 and the housing 11 biases the rotary plate 24 toward the stationary plate 21.

The rotary plate 24 is connected substantially tangentially thereof to one end of a push-pull cable indicated generally at 28, the other end being connected to the engine throttle (not shown). Preferably, the plate 24 has a stud 30 secured to its periphery and one end of a helical tension spring 31 is secured to stud 30 by a spring loop engaged in a groove 32 in the stud. The other end of the spring is secured to a connector block 33 slidable in a tubular fitting 34 telescoped within a tubular boss 35 on housing 11. The fitting 34 may have an annular groove 36 which receives a screw 22 to lock the fitting in place.

The block 22 may be swaged onto the end of the core 37 of the push-pull cable which may have a casing provided with an ineer Teflon liner 38, an intermediate layer 39 of helical wires and an outer layer 40 of thermoplastic material. When the pull on the throttle is released the spring 31 returns it to idle position.

The interfacing surfaces 21' and 24' of plates 21 and 24 are provided with circumferentially spaced complementary cam recesses 41 and 42, respectively. As shown in FIG. 5, antifriction elements, preferably spherical balls 43, are located in the interfacing recesses and maintain the plates in spaced-apart relation. Three pairs of recesses are shown, but the number may be varied. The cam recesses 41 and 42 have parallel inclined, substantially semi-cylindrical cam surfaces 44 and 45, respectively, of larger radius than the balls so as to provide line contact between the balls and longitudinal elements of the cam surfaces as seen in FIG. 6, and the surfaces 44 and 45 are inclined to the interfaces in the direction of the circumference passing through the balls and having the axis of the hub as its center. The diameter of this circumference may be termed the pitch diameter of the cam surfaces 44 and 45. As shown in FIGS. 1 and 5, the recesses 41 and 42 form raised protuberances 41' and 42' on the outer surfaces of the plates 21 and 24.

The surfaces 44 and 45 incline in opposite directions from the interfaces 21' and 24' and terminate in plane abutment surfaces 44a and 45a at 90° to the inclined surfaces and terminating at the the interfaces 21° and 24°, respectively. The inclined surfaces 44 and 45 are connected to the abutment surfaces 44a and 45a by curved surfaces 44b and 45b having radii less than the radii of the balls 43, so that when the balls are in point contact with the abutment surfaces, they will have point contact with the inclined surfaces, as indicated in FIG. 5.

In the operation of the improved modulator control, the throttle travel is approximately 1½ inches, and the force required to be applied to the push pin 16 to modulate the transmission is directly proportional to the throttle position and varies from 0 pounds at idle throttle to 14 pounds at full throttle. The improved actuator is designed to meet these conditions, and to compensate for a lost motion movement of 0.107 inches within the first 25% of the throttle travel from idle position.

It was determined that the lost motion movement of 0.107 could be obtained in the initial 17% of the throttle movement by having the cam surfaces 44 and 45 inclined to the interface surfaces 21' and 24', respectively, at angles of 30°. The mechanical advantage of the two inclined cams together with the relationship of the moment arm of cable connector stud 30 to the pitch diameter of the cam surfaces produces a total mechanical advantage of approximately 2.4 to 1 between the force applied to the throttle and that applied to the push pin. Thus the application of 14 pounds to the push pin requires application of only about 5.8 pounds to the throttle.

Figure 8:
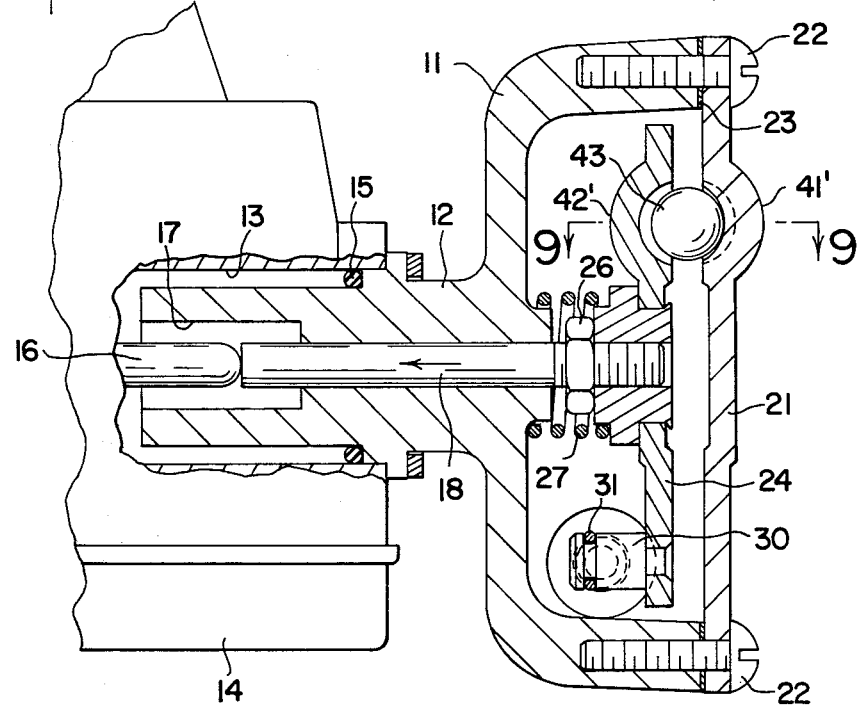
FIG. 8 is a view similar to FIG. 2 showing the rotary plate moved away from the stationary plate to compensate for the variation of the push pin location by taking up the lost motion travel between the push pin and the actuator rod.
Figure 9:
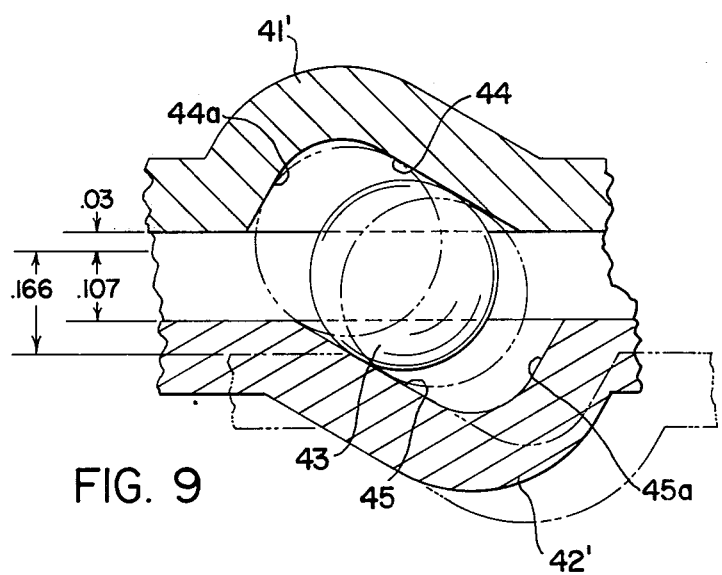
FIG. 9 is an enlarged partial sectional view on line 9—9 of FIG. 8.

FIG. 2 shows the push pin 16 spaced 0.107 inches from the end of the push rod 18 of the actuator, which is the amount of lost motion compensated for by the first 17% of the throttle travel from idle position. The position of the balls 43 between the inclined cam surfaces 44 and 45 corresponding to FIG. 2 is shown in FIG. 5 wherein the rotary plate 24 is spaced 0.03 inches from plate 21. When the 17% of the throttle travel has brought rod 18 into abutment with push pin 16, as shown in FIG. 8, the plate 24 has moved 0.107 inches farther away from plate 21 and further motion of the throttle cable 37 is absorbed by tension spring 31. The position of the balls 43 between cam surfaces 44 and 45 corresponding to FIG. 8 is shown in solid line in FIG. 9. The total separation movement possible of 0.166 inches is shown in phantom lines together with the corresponding position of the ball.

It will be understood that if the push pin is positioned in the transmission housing so that it is in abutment with the push rod 18 of the actuator at zero or idle position of the throttle, the cam plates 21 and 24 will be in the relative position of FIG. 2, and force will be applied to the push pin from idle throttle position to full throttle position without any lost motion.

Figure 10:
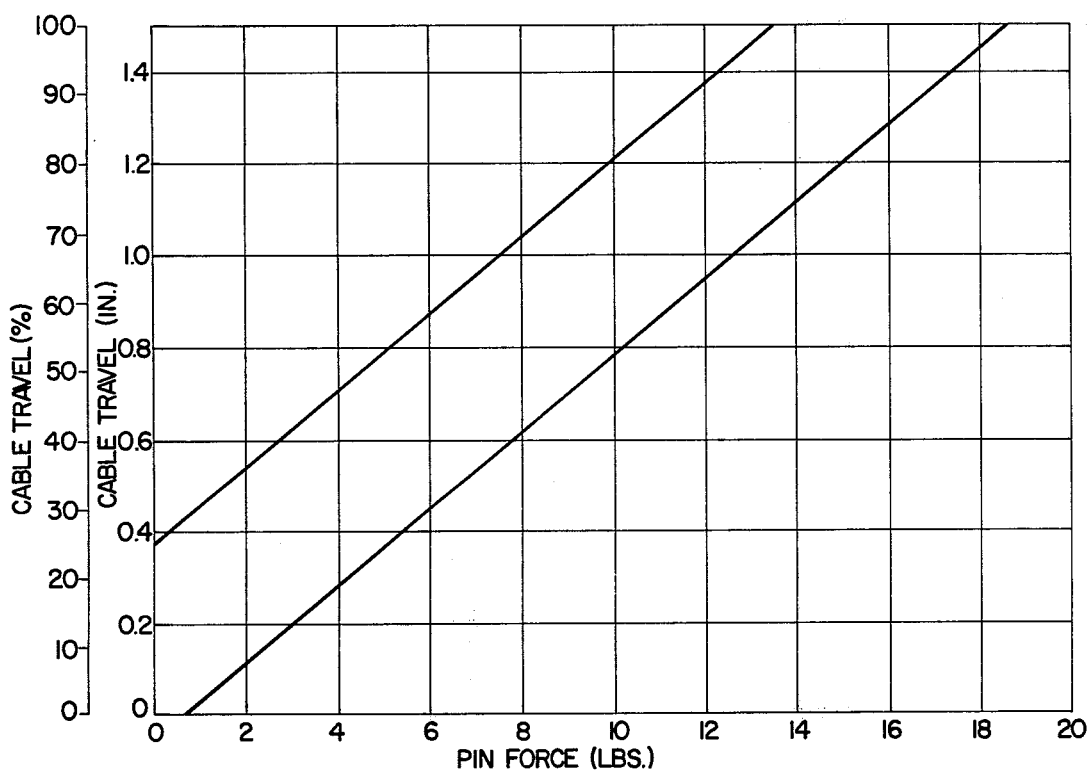
FIG. 10 is a graph showing the relationship of the throttle with respect to the increasing force applied to the push pin.

Referring to the graph shown in FIG. 10 which plots the force applied to the push pin against the throttle or cable travel, the upper inclined line gives the pin force values where the first approximately 25% of the throttle travel takes up the lost motion gap, and the lower inclined line gives the pin force values where there is no lost motion and force is applied immediately as the throttle moves away from zero or idle position. In both cases the straight lines show that the force varies in direct proportion to the throttle travel. The space between the two inclined lines delineates the range for various positions of the push pin intermediate zero lost motion and maximum lost motion.

The improved actuator applies force to the push pin of the modulator in direct proportion to the throttle travel, provides a mechanical advantage which reduces the required operating force, and compensates for variations in the linear position of the push pin in the transmission housing.

I claim:

1. An actuator for applying linear force to the push pin of an automatic transmission modulator valve to automatically change shift speeds in direct proportion to engine load demands, comprising interfacing rotary and stationary cam plates having circumferentially arranged opposed complementary cam surfaces, anti-friction elements between and contacting said surfaces, and means operatively connecting said rotary cam plate to the engine throttle for applying rotary force to said rotary plate, said rotary plate transmitting an increased value of said force linearly to said push pin in direct proportion to the travel of the throttle.

2. An actuator as described in claim 1, wherein the initial travel of the throttle moves the rotary and stationary cam plates away from each other to compensate for variations in the linear position of said push pin relative to the transmission housing.

3. An actuator as described in claim 1, wherein an axial element of said rotating cam plate transmits force linearly to said push pin.

4. An actuator as described in claim 2, wherein an axial element of said rotating cam plate transmits force linearly to said push pin.

5. An actuator as described in claim 1, wherein the complementary cam surfaces are inclined surfaces at equal angles to the interfacing plates.

6. An actuator as described in claim 1, wherein the complementary cam surfaces are inclined surfaces at substantially 30° to the interfacing plates.

7. An actuator as described in claim 6, wherein the force transmitted linearly has a ratio to the force applied to the throttle of substantially 2.4 to 1.

8. An actuator as described in claim 1, wherein the anti-friction elements are circumferentially spaced spheres.

9. An actuator as described in claim 4, wherein the anti-friction elements are circumferentially spaced spheres.

10. An actuator as described in claim 4, wherein the rotating cam plate has an axial rod transmitting force linearly to said push pin.

11. An actuator as described in claim 8, wherein the rotating cam plate has an axial rod transmitting force linearly to said push pin.

12. An actuator as described in claim 1, wherein the means for applying rotary force to said rotary plate is a push-pull cable tangentially connected to said rotary plate.

13. An actuator as described in claim 2, wherein the means for applying rotary force to said rotary plate is a push-pull cable tangentially connected to said rotary plate.

14. An actuator for applying linear force to the push pin of an automatic transmission modulator valve to automatically change shift speeds in direct proportion to engine load demands, comprising interfacing rotary and stationary plates, said rotary plate having an axial element for abutting said push pin, an inclined cam surface on the interface of at least one of said plates adapted to move said rotary plate axially on relative rotation of said plates, and means for operatively connecting the engine throttle to the rotary plate to apply a rotary force tangentially thereto and a resulting linear force to said push pin in direct proportion to the travel of the throttle.

15. An actuator as described in claim 14, wherein the initial travel of the throttle moves the rotary and stationary cam plates away from each other to compensate for variations in the linear position of said push pin relative to the transmission housing.

16. An actuator as described in claim 14, wherein the rotary and stationary cam plates have complementary inclined cam surfaces.

17. An actuator as described in claim 14, wherein the means for operatively connecting the engine throttle to the rotary plate includes a tension spring for absorbing the throttle travel when the axial element of the rotary plate is in abutment with said push pin.

* * * * *